United States Patent Office 3,039,998
Patented June 19, 1962

3,039,998
PREPARATION OF POLYESTERS USING AN ONIUM COMPOUND AS A CATALYST
Jan A. K. Boerma, Arnhem, Netherlands, assignor, by mesne assignments, to N.V. Onderzoekingsinstituut Research, Arnhem, Netherlands, a corporation of Netherlands
No Drawing. Filed Dec. 20, 1956, Ser. No. 629,489
Claims priority, application Netherlands Jan. 21, 1956
3 Claims. (Cl. 260—75)

This invention relates to an improved method for preparing a synthetic linear polyester and more particularly to a method for preparing polyethylene terephthalate.

The preparation of polyalkylene terephthalates from glycols of the series $HO(CH_2)_nOH$, wherein $n$ represents an integer between 2 and 10, and an ester-forming derivative of terephthalic acid by heating is generally known. Whinfield and Dickson in U.S. Patent 2,465,319 disclosed the production of a class of linear polyesters by the condensation of terephthalic acid with a dihydric alcohol.

From a commercial standpoint, one of the most satisfactory methods has been the ester interchange method in which ethylene glycol and di-methyl terephthalate are reacted to form bis-2-hydroxy-ethyl terephthalate which is subsequently condensed to polyethylene terephthalate under reduced pressure and at elevated temperature.

Heretofore various materials have been proposed as catalysts, both for the ester interchange reaction and for the subsequent condensation reaction. Catalysts containing metals such as lithium, sodium, potassium, calcium, magnesium, zinc, cadmium, aluminum, manganese, iron and nickel have been suggested. Other catalysts used in the past with some degree of success include alkaline earth metal alcoholates, the alkali metal carbonates, alkaline earth oxides and lead oxide. Recently antimony, ferric acetate, aluminates, and other compositions have been suggested as catalysts.

However, there are many disadvantages which ordinarily accompany the heretofore known catalysts. One of the greatest disadvantages has been that when the polyesters containing the known catalysts are exposed to high temperatures which is necessary in the melt spinning process a notably high degree of thermal degradation of the polymer occurs.

Therefore, an object of the present invention is to provide a catalyst for accelerating the reaction between glycols and terephthalate and the subsequent polymerization to synthetic linear polyesters.

Another object of the present invention is to provide a catalyst for accelerating the production of synthetic linear polyesters having a high degree of resistance to heat degradation.

Other objects will become apparent from the following more complete description of the instant invention.

Surprisingly it has been found that polyalkylene terephthalates may be prepared at a commercial rate from ester-forming derivatives of terephthalic acid and glycols, which on heating at a relatively high temperature show a considerably greater resistance to thermal degradation, if according to the present invention at least the ester interchange is carried out in the presence of certain organic bases or their salts as catalysts. These organic compounds which have been found particularly useful are metal-free onium compounds selected from the groups consisting of ammonium, sulfonium, phosphonium and oxonium compounds. The preferred types of onium compounds are ammonium bases and their salts because they are readily obtainable on the market and may be found in many varieties.

If the thermostability of the polyester is desired, it is preferred that the ester interchange reaction as well as the polycondensation is catalyzed by these onium compounds.

Examples of the onium catalysts which have been found useful according to the present invention are organic ammonium bases and their salts, such as tetra-ethyl ammonium terephthalate, tetra-ethyl ammonium hydroxide, tetra-ethyl ammonium chloride and tetra-ethanol ammonium terephthalate, organic sulfonium bases and their salts, such as di-butyl ethyl sulfonium terephthalate, di-benzyl methyl sulfonium hydroxide and 1 - chloro - 1 - methyl-tetrahydrothiophene, phosphonium bases and their salts, such as tetra-butyl phosphonium hydroxide and ethyl tri-morphinyl phosphonium bromide, and the organic oxonium bases and their salts, such as 2,6-dimethyl-γ-pyrone hydrochloride and 2,6-dimethyl-γ-pyrone methyl bromide.

Only a small amount of the substance is needed to obtain the desired effect according to this invention. Generally an amount of less than 1% catalyst by weight calculated on di-methyl terephthalate taken as a starting material is sufficient. Amounts greater than 1% do not increase the reaction rate proportionately, if at all. Lesser amounts of the catalysts may be decreasingly effective and the selection of the amount may depend upon the desired rapidity of the reaction.

The polymers prepared according to the invention may be processed in known ways to form products, such as threads, fibers and films. The properties of said products, such as the strength and the elongation, are just as satisfactory as those of products manufactured under equal circumstances from polyesters having been prepared by adding known catalysts. However, the lucidity of the products such as films, threads and the like manufactured from the polyesters, according to the present invention, is much greater than that of products manufactured from polyesters, which have been prepared in the presence of the known catalysts. Furthermore, on heating to high temperatures, the thermal degradation of products prepared from polyesters according to the present invention, is also much less.

This invention will be further illustrated by the following examples:

*Example I*

In a glass container, under atmospheric pressure and while stirring the following mixture was heated:

|  | G. |
|---|---|
| Di-methyl terephthalate | 2000 |
| Ethylene glycol | 1920 |
| Tetra-ethyl ammonium terephthalate | 12 |

The temperature was gradually raised from 140° C. to 225° C. with methanol being distilled off.

After about 9 hours the ester interchange was 99.4% completed.

The ester interchange product (bis-2-hydroxy ethyl terephthalate) was then transferred into a stainless steel autoclave, in which the heating of the ester interchange product was continued at a temperature of 272° C. At the same time the pressure was slowly decreased to 0.1 mm. Hg.

After polymerizing the material at the elevated temperature for 6 hours a polymer was obtained which had a viscosity in solution of 0.56 (determined at 30° C. in a 1% solution in metacresol).

The polymer was very clear and still contained about 20% by weight of the initially present proportion of nitrogen from the catalyst. The melting point of the polymer was between 261–263° C.

After 1 hour heating the polymer at 282° C. the viscosity in molten condition of said polymer decreased about 400 poises, whereas the viscosity in molten condition of a polymer of the same degree of condensation, but prepared in the presence of 0.015% by weight of zinc acetate and 0.02% by weight of antimony oxide during the same period of heating decreased 1000 poises.

The thermal degradation of the polymer prepared according to the present example was considerably less than that of the polymer prepared in the presence of zinc acetate and antimony oxide.

From said polyesters threads were formed in the known manner, which exhibited excellent lucidity and thermostability.

Example II

A mixture of

| | | |
|---|---|---|
| Di-methyl terephthalate | g | 120 |
| Ethylene glycol | g | 111 |
| Tetra-ethyl ammonium terephthalate | mg | 700 | was ester interchanged in the same manner as in Example I under atmospheric pressure for 2.5 hours in a glass apparatus. Then, the ester interchange product was, as in Example I, polycondensated at the same pressure, but at a temperature of 282° C.

After 7 hours the polymer obtained had a viscosity in solution of 0.63, determined as in Example I. The polymer was very clear and had a melting point of 260–262° C. The polymer exhibited excellent thermostability as compared with the polymer prepared in the presence of certain known catalysts shown in Example I.

Example III

A mixture of

| | | |
|---|---|---|
| Di-methyl terephthalate | g | 120 |
| Ethylene glycol | g | 111 |
| A solution of 19% by weight of tetra-ethyl ammonium hydroxide in water | ml | 2 | was ester interchanged in a manner analogous to Example I under atmospheric pressure for 2.5 hours and then polycondensated at 282° C. under a pressure of 0.1 mm. Hg.

After polymerizing the ester interchange product for two hours, a polymer was obtained with a viscosity in solution of 0.39 which was very clear. The polymer had a melting point of from 263–265° C. and showed excellent thermostability.

Example IV

A mixture of

| | | |
|---|---|---|
| Di-methyl terephthalate | g | 120 |
| Ethylene glycol | g | 111 |
| Tetra-ethyl ammonium chloride | mg | 600 | was ester interchanged in a manner analogous to Example I under atmospheric pressure for 10 hours and the interchange product polymerized for 3 hours at 282° C. under a pressure of 0.1 mm. Hg.

The polymer obtained was very clear and had a viscosity in solution of 0.44 and a melting point of from 260–262° C.

The polymer was substantially free of chloride and exhibited excellent thermostability.

Example V

A mixture of

| | | |
|---|---|---|
| Di-methyl terephthalate | g | 120 |
| Ethylene glycol | g | 111 |
| Tetra-ethanol ammonium terephthalate | mg | 720 | was ester interchanged in the manner described in the preceding examples for 10 hours and then polycondensated for 7 hours at 282° C. under a pressure of 0.1 mm. Hg.

The polymer obtained was very clear and had a melting point of about 260° C., a viscosity in solution of 0.66, and had excellent thermostability.

Example VI

A mixture of

| | | |
|---|---|---|
| Di-methyl terephthalate | g | 120 |
| Ethylene glycol | g | 111 |
| Di-butyl-ethyl sulphonium terephthalate | mg | 700 | was ester interchanged for 2.5 hours in a manner similar to Example I. Then it was polycondensated at a temperature of 280° C. under a pressure of 0.1 mm. Hg.

After polymerizing the ester interchange product for 6 hours, the polymer obtained had a viscosity in solution of 0.60. Also, the polymer was very clear, had a melting point 260° C., and exhibited excellent thermostability.

While di-methyl terephthalate is the preferred ester monomer, one may substitute other lower di-alkyl terephthalates such as di-ethyl, di-propyl or di-isobutyl terephthalate, with similar results. Also, in place of ethylene glycol, described in the foregoing examples, there may be substituted other polymethylene glycols having 3 to 10 methylene groups with similar results.

The above examples are given to illustrate and are not to be construed as limitations to the present invention.

What is claimed is:

1. In a process for the production of a filament forming polyethylene terephthalate having a melting point of about 260° C., a viscosity in a 1% solution in metacresol at 30° C. of at least 0.39, and wherein bis-hydroxy-ethyl-terephthalate is polymerized in the presence of a catalyst, the improvement which comprises polycondensing the said bis-hydroxy-ethyl-terephthalate in the absence of a metal containing catalyst and using as a catalyst an organic metal-free quaternary ammonium compound, wherein the polyethylene terephthalate produced has improved resistance to heat degradation and improved clarity.

2. The process of claim 1 wherein the catalyst is a tetraethyl ammonium compound.

3. The process of claim 2 wherein the catalyst is tetra-ethyl ammonium terephthalate.

References Cited in the file of this patent

UNITED STATES PATENTS

| 2,465,319 | Whinfield | Mar. 22, 1949 |
| 2,727,881 | Caldwell | Dec. 20, 1955 |
| 2,742,494 | Mraz | Apr. 17, 1956 |
| 2,779,783 | Hayes | Jan. 29, 1957 |

OTHER REFERENCES

Bennett: Page 682, Concise Chemical and Technical Dictionary, published 1947, Chemical Publishing Co., Brooklyn, N.Y.